United States Patent [19]

Bracker et al.

[11] Patent Number: 4,485,745
[45] Date of Patent: Dec. 4, 1984

[54] METHOD FOR THERMAL PROCESSING OF SOLID WASTE AND THE APPARATUS FOR CARRYING OUT THE METHOD

[75] Inventors: Gerd-Peter Bracker; Hanns-Helmut Riemann, both of Bochum, Fed. Rep. of Germany

[73] Assignee: Mannesmann Veba Umwelttechnik GmbH, Herne, Fed. Rep. of Germany

[21] Appl. No.: 385,644

[22] PCT Filed: Jan. 21, 1982

[86] PCT No.: PCT/DE82/00013
 § 371 Date: May 20, 1982
 § 102(e) Date: May 20, 1982

[87] PCT Pub. No.: WO82/02585
 PCT Pub. Date: Aug. 5, 1982

[30] Foreign Application Priority Data

Jan. 22, 1981 [DE] Fed. Rep. of Germany ....... 3101961

[51] Int. Cl.³ .................................................. F23G 1/00
[52] U.S. Cl. ...................................... 110/229; 110/210; 110/226; 110/233; 110/246; 110/342; 110/346; 431/5

[58] Field of Search ............... 110/203, 204, 210, 211, 110/342, 344, 345, 346; 48/210; 432/15; 431/5

[56] References Cited

U.S. PATENT DOCUMENTS

| 3,853,498 | 12/1974 | Bailie | 48/210 |
| 4,179,263 | 12/1979 | Jung et al. | 110/346 |
| 4,359,006 | 11/1982 | Have | 110/346 |
| 4,361,100 | 11/1982 | Hinger | 110/346 |

FOREIGN PATENT DOCUMENTS 155450 6/1982 German Democratic Rep. .............. 110/211

Primary Examiner—Edward G. Favors
Assistant Examiner—Steven E. Warner
Attorney, Agent, or Firm—Oblon, Fisher, Spivak, McClelland & Maier

[57] ABSTRACT

In a method of thermal solid waste exploitation the pure pyrolysis gases are used for auxiliary heating in combustion and the flue gases from combustion are used for heating in pyrolysis. In a solid waste processing installation the pure gas outlet of the pyrolysis unit is connected to the auxiliary burner of the combustion unit and the pyrolysis reactor is arranged between the flue gas outlet of the combustion unit and a waste heat retrieval unit.

1 Claim, 1 Drawing Figure

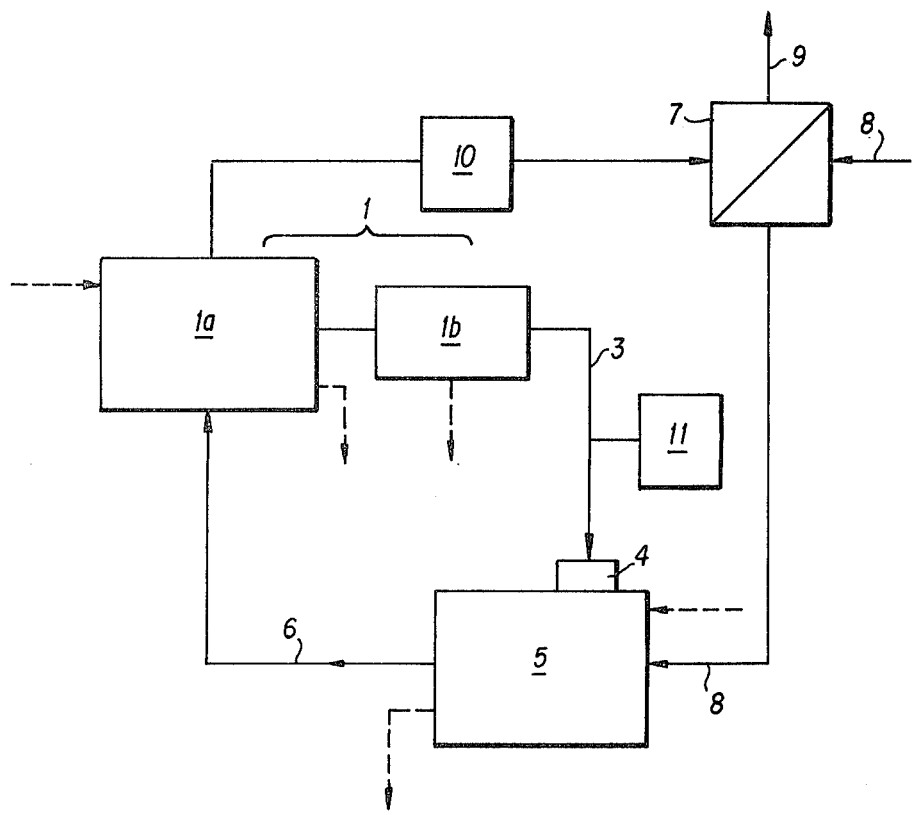

METHOD FOR THERMAL PROCESSING OF SOLID WASTE AND THE APPARATUS FOR CARRYING OUT THE METHOD

The invention relates to a method for the thermal portion of solid waste exploitation by burning and pyrolisis of the garbage as well as the suitable portion of the solid waste processing installation for implementing the method.

It is known with such methods to arrange and to operate completely separately the devices found in one and the same solid waste burning installation, namely the burning installation and the pyrolysis installation. The oil or natural gas-fired auxiliary burners of the combustion unit that can be switched over as an aggregate to control-unit control, serve as the start-up for the combustion unit and operate during the sustained operation of the installation only as long as is necessary to maintain as constant a combustion temperature relative to the instantaneous burning capacity of the waste as possible. On the other hand the pyrolysis unit is heated with the pure pyrolysis gas left after removing the recombustable macro-molecular components.

Furthermore, a method is known for thermal solid waste exploitation through pyrolysis and combustion in which the pyrolysis gases are taken untreated into a combustion reactor lined with pyrolysis coke, where it is cracked and burned as a mixture with the reactor gas as in a gas motor. The pyrolysis drum is heated with the exhaust gases from the gas motor. The apparatus is a modification of the wood generator for example, in order to use waste as a fuel and to convert the low temperature carbonization gases into a composition more suitable for powering motors.

The object of the invention is to make solid waste utilization more energy efficient, particularly so that no or very little oil or natural gas is needed for the back-up burners. This object is realized in the fact that the additional heating that assists the combustion of the waste at least partially comes from the burning of the gases generated in pyrolysis, and the heat needed for pyrolysis is provided by the flue gas from the combustion. The invention is based on the realization that the flue gas temperatures of a solid waste combustion chamber are high enough for the pyrolysis procedure, and the burning of pure pyrolysis gas for an auxiliary burner produces adequate temperatures.

The drawing illustrates, as an example, the thermal portion of a solid waste processing installation in a schematic view.

The solid waste processing installation according to the drawing consists of a pyrolysis unit 1 with a pyrolysis reactor 1a constructed as a rotatable drum, for example, and a unit 1b which is made up of condensor and gas scrubber units, whereby so-called "pure" pyrolysis gas leaves this apparatus. The pure gas outlet 3 is connected to an auxiliary burner 4 of a combustion unit 5. Between the flue gas outlet 6 of the combustion unit 5 and the auxiliary pre-heater 7 are the pyrolysis reactor 1a and a waste heat retrieval unit 10. In the auxiliary pre-heater 7 the combustion air 8 is heated by the flue gases that are drawn off through the smoke stack 9.

The solid arrows refer to the gaseous media; the dotted arrows represent the flow of liquids or solids in the pyrolysis unit 1 on the one hand and in the combustion unit 5 on the other.

The flue gases leaving the flame chamber of the combustion unit 5 at approximately 1200° C. are conveyed through the duct 6 to the pyrolysis reactor 1a, with the drum configuration discussed above, first to an interior radiating heat surface and then to the outer drum casing. The temperature at which the pyrolysis material is processed is in the magnitude of 500°–700° C. The flue gases leaving the pyrolysis reactor are cooled to smoke stack temperature in the waste heat recovery unit 10 and the back-up pre-warmer 7.

The illustrated system schematic is the simplest in construction and is relevant in the ideal situation where there is a balanced energy budget in which the amount of pure pyrolysis gas generated equals exactly the supplementary heating requirements of the combustion unit 5. Depending on the type of waste available at any given time for combustion, this waste can be sufficiently exothermic so that there is an excess of pure pyrolysis gas. Accordingly, there should be a gas storage container 11 connected to the duct 3, which is designed to accommodate in volume at least the startup and peak gas eduction. For the situation where endothermic sludge is to be burned, the supplementary burner 4 can be one of a group whose remaining burners can be supplied with a controlled quantity of oil or gas.

On the other hand, with solid waste exploitation it can occur that the pyrolysis or combustion unit is temporarily shut down. Therefore, both components are constructed so that they can also be operated separately in the conventional manner.

We claim:

1. A solid waste procesing apparatus comprising:
   a pyrolysis unit including a pyrolysis gas purifying means;
   a combustion unit including an auxiliary burner;
   first means for communicating pure pyrolysis gas from said pyrolysis unit with said auxiliary burner;
   second means for communicating flue gas from said combustion unit with said pyrolysis unit;
   means for waste heat retrieval;
   third means for communicating said flue gas from said pyrolysis unit with said means for waste heat retrieval; and
   a pure pyrolysis gas storage container connected to said first means for communicating, whereby a sufficient volume of said pure pyrolysis gas for start up and peak gas eduction is available for use in said combustion unit.

* * * * *